(12) United States Patent
Isham

(10) Patent No.: US 7,345,463 B2
(45) Date of Patent: Mar. 18, 2008

(54) LOAD COMPENSATED SWITCHING REGULATOR

(75) Inventor: Robert H. Isham, Flemington, NJ (US)

(73) Assignee: Intersil Americas Inc., Milpitas, CA (US)

( * ) Notice: Subject to any disclaimer, the term of this patent is extended or adjusted under 35 U.S.C. 154(b) by 0 days.

(21) Appl. No.: 11/557,143

(22) Filed: Nov. 7, 2006

(65) Prior Publication Data

US 2008/0007241 A1    Jan. 10, 2008

Related U.S. Application Data

(60) Provisional application No. 60/819,161, filed on Jul. 7, 2006.

(51) Int. Cl.
*G05F 1/40* (2006.01)
(52) U.S. Cl. .................................................. 323/285
(58) Field of Classification Search ................ 323/284, 323/285, 283
See application file for complete search history.

(56) References Cited

U.S. PATENT DOCUMENTS 6,954,054 B2 * 10/2005 Brown ....................... 323/283

* cited by examiner

*Primary Examiner*—Shawn Riley (57) ABSTRACT

A load compensated voltage regulator comprises a chip including a control section having an error amplifier, a pulse width modulator (PWM), the PWM outputting at least one driver control signal. At least one driver has an input coupled to receive the driver control signal. An output stage includes at least one output transistor having an input coupled to an output of the driver. The output transistor drives an inductor in series with a grounded capacitor, wherein an output of the regulator ($V_{OUT}$) is at a node between the inductor and the capacitor, wherein $V_{OUT}$ generates a load current across a load when connected across the capacitor. A feedback connector is provided for feeding back a feedback signal representative of the load current to circuitry for outputting a gate driver voltage supply control signal based on at least reference level and the feedback signal. A connector couples at least one power supply to the driver through a switch or a second regulator. The gate driver voltage supply control signal is coupled to the switch or regulator, wherein the gate driver voltage supply control modulates a voltage level of the gate driver voltage supply between at least two different levels based on the load current.

17 Claims, 5 Drawing Sheets

Switching Regulator with Gate Drive Supply Regulated By Digital Means

In this example the UGATE, or BOOT supply and the LGATE supply are the same.

Figure 1, Typical Switching Regulator

PRIOR ART

Figure 2, Typical Switching Waveforms

Figure 3, Efficiency Verses Gate Drive, Existing Circuits (PRIOR ART)

Figure 4, Efficiency Verses Gate Drive, Changing Drive

Figure 5, Switching Regulator with added Supply Switching

In this example the UGATE, or BOOT supply and the LGATE supply are the same

Figure 6, Switching Regulator with Regulated Supply

In this example the UGATE, or BOOT supply and the LGATE supply are the same.

LOAD COMPENSATED SWITCHING REGULATOR

CROSS-REFERENCE TO RELATED APPLICATIONS

This application claims the benefit of Provisional Application No. 60/819,161 entitled "LOAD COMPENSATED SWITCHING REGULATOR" filed on Jul. 7, 2006, which is incorporated by reference in its entirety into the present application.

FIELD OF THE INVENTION

The invention relates to closed loop voltage regulators, and more particularly to switching regulators having networks for improving power efficiency.

BACKGROUND OF THE INVENTION

Figure 1:
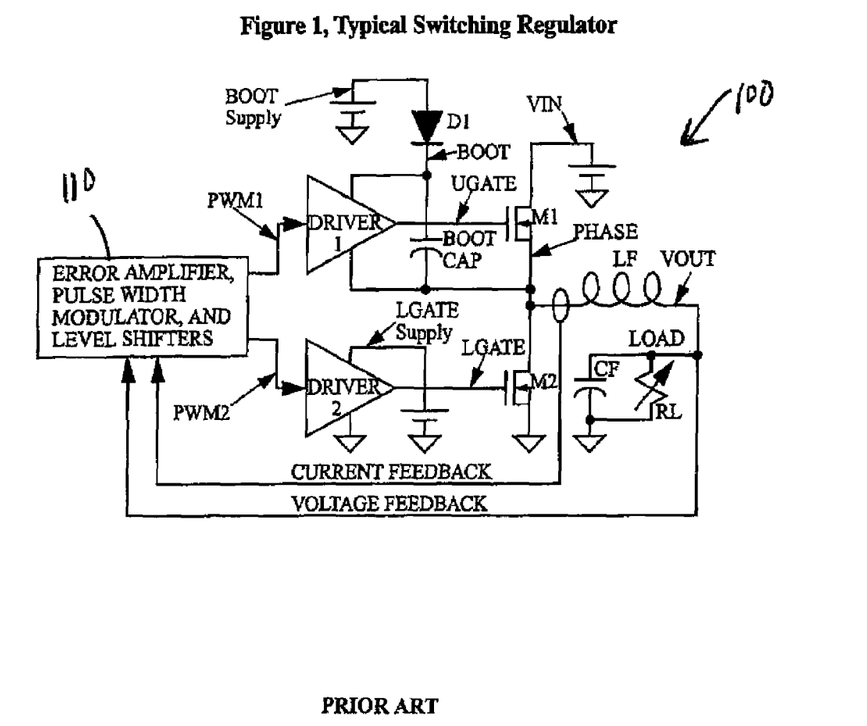
FIG. 1 shows the schematic of a known closed loop pulse width modulated DC-DC regulator with an emphasis on the output portion of the regulator.
Figure 2:
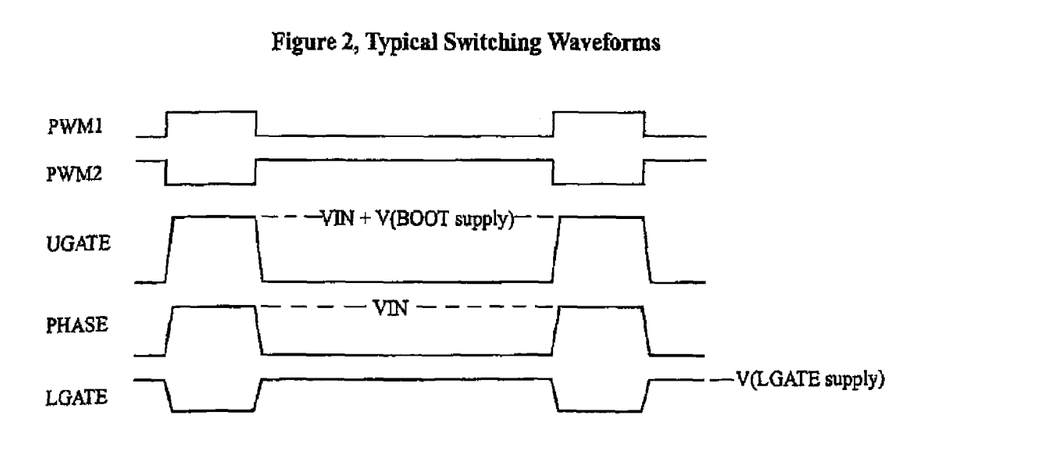
FIG. 2 shows typical switching waveforms at various internal nodes for the regulator shown in FIG. 1.

FIG. 1 shows a typical switching regulator 100, emphasizing the output section, while FIG. 2 shows pertinent switching waveforms for regulator 100. The control section of the regulator, not shown in detail, typically comprises an error amplifier with feedback components, a modulator circuit, and level shifters, collectively 110, to translate the resulting desired pulse widths into signal levels suitable for the Drivers 1 and 2. A reference voltage is typically applied to the non-inverting input of error amplifier contained in control section 110. The output of the error amplifier drives a pulse width modulator, PWM. The PWM outputs driver control signals shown as PWM1 and PWM2 which drive Driver 1 and Driver 2, respectively.

Drivers 1 and 2 take PWM1 and PWM2 and drive relatively high currents into the gates of NMOS output devices M1 and M2. These signals are shown in FIG. 1 as UGATE and LGATE. The drivers normally also incorporate a non-overlap circuit (not shown), that prevents M1 and M2 from both conducting at the same time.

The desired output is at the node shown as PHASE, which is at the source of M1 and the drain of M2. During operation of regulator 100 PHASE switches between levels approaching $V_{IN}$ (when M1 on) and ground (when M2 on). PHASE then passes through a low pass filter comprising LF in series with CF, to become $V_{OUT}$ across load RL. Optional voltage and current feedback is shown, for instance, to maintain a specified relationship between output voltage and output current.

For reasons of economy, M1 and M2 are typically both double-diffused NMOS (DMOS). The driver for M2, the source of M2 being at ground, is typically powered from a supply (shown as LGATE Supply), which is also returned to ground.

It is desirable that M1, whose source is at node PHASE, has a driver and driver supply that is related to PHASE. Specifically, the power supply should move up and down with PHASE, keeping a relatively constant voltage with respect to PHASE. That supply, shown as BOOT supply, typically includes a diode such as D1 and capacitor such as the BOOT Cap shown. The voltage at node BOOT with respect to PHASE is approximately that provided by the BOOT supply.

The voltage at BOOT could be made related to ground rather than PHASE, if D1 was replaced with a direct connection and the BOOT cap was omitted. The BOOT supply voltage level would need to be higher than the $V_{IN}$ supply level (typically 5 V higher, or more) so that M1 can be strongly turned on, and when on, be in a low RDSon condition. This mode of operation is less desirable than a floating BOOT supply, as it requires higher voltage components and generates more wasted power. Further discussion will assume that a floating BOOT supply is used.

Very often the LGATE supply and the BOOT supply are the same supply. This might be due to a lack of pins available on an IC, for instance, when D1 is integrated within the IC.

There are conflicting requirements placed on the voltage selected for the BOOT and/or the LGATE supplies. The RDSon of a DMOS such as M1 or M2 contributes significantly to the power loss, or lack of power efficiency, of regulator 100. The average load current, Iload, flowing through inductor LF also flows through M1 or M2. The power loss in M1 or M2 is directly proportional to its RDSon multiplied by the square of Iload. As the RDSon of a DMOS can be improved (made lower) over a fairly wide range by increasing the Gate drive level, it is beneficial to use as high a value of BOOT or LGATE supply as the driver circuit can handle based on the voltage drop (RDSon component) considerations across M1 or M2.

A second major component of loss of efficiency for regulator 100 is the charge that must be inserted and removed from the DMOS' (M1 and M2) gate capacitance, once every switching cycle. Increasing the gate drive voltage increases the magnitude of the charge that must be inserted and removed each cycle, which increases the average current during switching. This increased average current gets dropped through the driver from an increased supply voltage. The gate capacitance induced power loss is therefore proportional to the square of the drive voltage, making it beneficial to use as low a driver voltage as possible.

Figure 3:
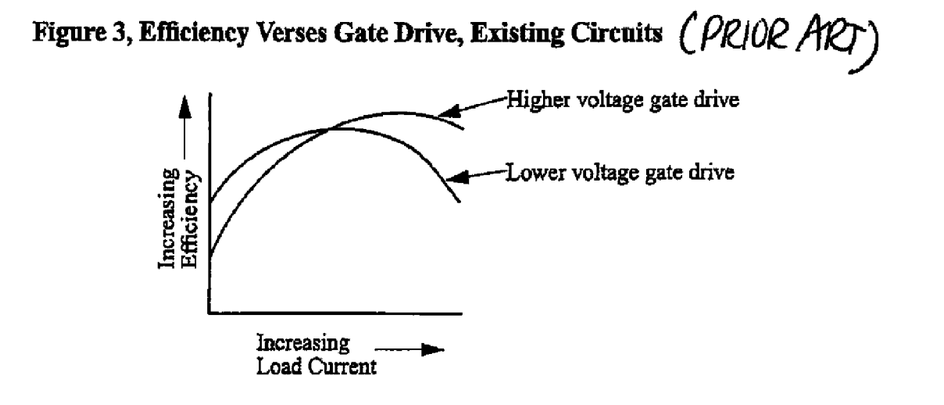
FIG. 3 shows a plot of efficiency versus load current for higher supply voltage gate drive levels and lower supply voltage gate drive levels for the regulator shown in FIG. 1.

FIG. 3 shows an exemplary plot of efficiency versus load current for higher and lower gate driver voltage supply levels for the regulator shown in FIG. 1. For purposes of simplicity, it is assumed that the BOOT and LGATE supplies are the same supply. The RDSon component of power loss through M1 and M2 is seen to tend to dominate at relatively high load currents, and the gate charge component of power loss tends to dominate at low load current levels. Accordingly, efficiency cannot be optimized for both high and low current operation. Instead, a relatively high fixed gate driver supply voltage is generally selected for regulator operation, thus wasting power when running at low load current levels. What is needed is a pulse width modulated converter design that provides different gate driver supply voltages for different load current levels that removes the tradeoff in efficiency between high load current and low load current operation.

SUMMARY

A load compensated voltage regulator is described herein that detects the load current and uses a signal representative of the load current, and optionally other measurables of circuit characteristics, to modulate the gate driver voltage supply level. Regulator efficiency is improved by using higher gate driver supply voltages at higher load currents, and lower gate driver supply voltages at lower load currents. The error amplifier, pulse width modulator (PWM), and level shifters for the regulators according to the invention are not part of the present invention, but as noted above are described herein for completeness.

A load compensated voltage regulator comprises a chip including a control section comprising an error amplifier, a pulse width modulator (PWM), an input of the PWM hooked to an output of the amplifier, the PWM outputting at least one driver control signal. At least one driver has an input coupled to receive the driver control signal. An output stage comprises at least one output transistor having an input coupled to an output of the driver. The output transistor drives an inductor in series with a grounded capacitor, wherein an output of the regulator ($V_{OUT}$) is at a node between the inductor and the capacitor, Vout generating a load current across a load when connected across the capacitor.

A feedback connector is provided for feeding back a feedback signal representative of the load current to circuitry for outputting a gate driver voltage supply control signal based on at least one reference level and the feedback signal. A connector couples at least one power supply to the driver through a switch or a second regulator. The gate driver voltage supply control signal is coupled to the switch or regulator, wherein the gate driver voltage supply control signal modulates a voltage level of the power supply between at least two different levels based on the load current. In a preferred embodiment the feedback signal comprises a current feedback signal and the reference level comprises a current reference level.

In one embodiment, the PWM outputs at least a first and a second driver control signal and the at least one driver comprises a first and second driver for receiving the first and second driver control signals, wherein the first and second drivers drive gates of the first and second output transistors, respectively.

The circuitry for outputting a gate driver power supply control signal can comprise at least one comparator. In this embodiment, the output of the comparator is coupled to the switch. In one embodiment the comparator comprises a first and a second comparator, and the switch comprises a first and second switch. The first comparator and the first switch are associated with a first lower voltage power supply and a second comparator and the second switch are associated with a second higher voltage power supply. The at least one reference level comprises a first and a second reference level, wherein the first reference level is input to the first comparator to switch to the first lower supply voltage level when the load current is less than the first reference level and a higher load current level is used as a second reference level to the second comparator to switch to the second higher supply voltage level when the load current exceeds the second reference level.

The above described embodiment employs hysterisis: An increasing load current causes a switch to the higher supply voltage at a higher load current level than a decreasing load current causes a switch to the lower supply voltage. As known in the art, this prevents multiple switching between supply voltages that might occur with only one reference level and a load current that might be dithering near that level.

The reference level (or levels) can be set on the chip. In this embodiment the reference level or levels can comprises one or more current reference levels, wherein the current reference levels are fixed ratios of a settable current available on the chip, such as an over current trip current.

In a digital realization, the circuitry for outputting the gate driver voltage supply control signal can comprises at least one A/D converter for receiving the feedback signal representative of the load current, wherein a digital output of the A/D couples to a circuit implementing an algorithm or look up table. The look up table or algorithm calculates a best case supply voltage based on factors such as switching frequency and gate charge and RDSon verses drive voltage for the output transistors. In one embodiment, the at least one A/D converter comprises at least a first and a second A/D converter, wherein the second A/D receives a signal representative of $V_{OUT}$. The control section can be coupled to the circuit for implementing an algorithm or look up table, the control section providing frequency information to the circuit implementing an algorithm or look up table.

A method of load compensating a voltage regulator comprises the steps of providing a voltage regulator comprising a chip including a control section comprising an error amplifier, a pulse width modulator (PWM), an input of the PWM hooked to an output of the error amplifier, the PWM outputting at least one driver control signal, at least one driver having an input coupled to receive the driver control signal, and an output stage comprising at least one output transistor having an input coupled to an output of the driver, the output transistor driving an inductor in series with a grounded capacitor. An output of the regulator ($V_{OUT}$) is at a node between the inductor and the capacitor, wherein $V_{OUT}$ generating a load current across a load when connected across the capacitor. The load current is detected. The load current is used to modulate a supply voltage to the gate driver, wherein a higher gate drive supply voltage is used at higher load currents and lower gate drive voltage is used at lower load currents. In one embodiment, the voltage supplied to the gate driver is provided by switching between two fixed power supplies having different voltage levels.

The method can comprise the steps of digitizing a signal representative of the load current to provide a digital load current signal, and determining the voltage supplied to the gate driver based on the digital load current and at least one parameter selected from the group consisting of operating frequency of the regulator, input voltage supplied to an output device of the regulator, output voltage of the regulator, gate charge for the output device, and RDSon verses the voltage supplied to the gate driver for the output device.

In one embodiment the voltage regulator includes a first and second driver for receiving first and second driver voltage supply control signals, the first and second drivers for driving gates of first and second output transistors, wherein the method further comprises the step of determining a supply voltage for the first driver based on a first reference level and a supply voltage for the second driver based on a second reference value, the first and second reference levels corresponding to different load current levels.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION

A load compensated voltage regulator is described herein that detects the load current and uses the load current, and optionally other measurables of circuit characteristics, to modulate the gate driver voltage supply level. Higher gate driver supply voltages are provided at higher load currents, and lower gate driver supply voltages at lower load currents. Such supply switching improves the power efficiency of the switching regulator. The gate driver voltage supply regulation may be implemented through analog circuitry, or primarily digital circuitry. Although the invention as described herein is shown as being based on CMOS circuitry, those having ordinary skill in the art will appreciate the invention can be realized in bipolar or BIMOS designs.

The error amplifier, pulse width modulator (PWM), and level shifters for the regulators according to the invention described herein are not part of the present invention, but as noted above are described herein for completeness. The load compensated voltage regulator comprises a chip including a control section comprising an error amplifier, a PWM, an input of the PWM being hooked to an output of the error amplifier. The PWM outputs at least one driver control signal. At least one driver has an input coupled to receive the driver control signal. At least one output transistor has an input coupled to an output of the driver. The output transistor drives an inductor in series with a grounded capacitor, wherein an output of the regulator ($V_{OUT}$) is at a node between the inductor and the capacitor, wherein $V_{OUT}$ generates a load current across a load when connected across the capacitor.

A feedback connector feeds back a feedback signal representative of the load current to circuitry for outputting a gate driver voltage supply control signal based on a reference level and the feedback signal. A connector couples at least one power supply to the driver through a switch or a second regulator. The gate driver voltage supply control signal is coupled to the switch or regulator, wherein the control signal modulates a voltage level of the power supply between at least two different levels based on the load current.

Generally, at least a pair of drivers comprising a first and second driver having respective inputs are coupled to receive first and second driver control signals output by the PWM. In this arrangement, first and second output transistors having respective inputs are coupled to outputs of the first and second drivers, respectively.

Figure 4:
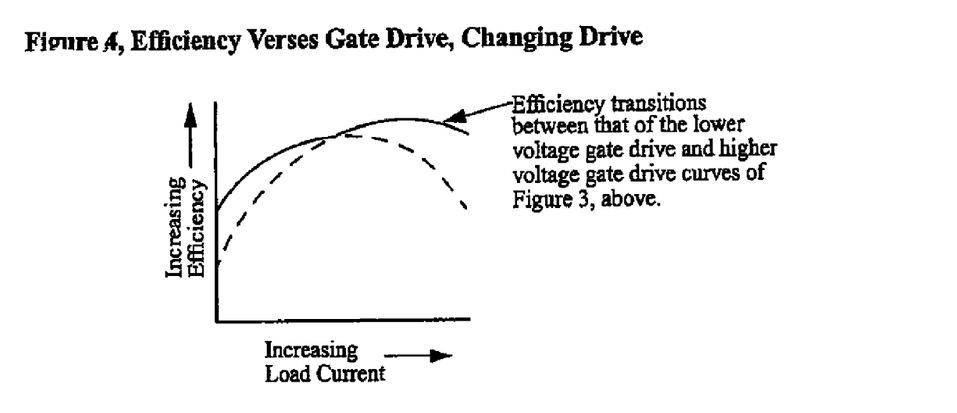
FIG. 4 shows a plot of efficiency versus load current using the load current modulated gate drive provided by regulators according to the invention derived from changing the supply voltage gate drive based on the load current level, such as regulator 500 shown in FIG. 5. The solid line shows the power efficiency realized by the present invention by transitioning between that of the lower supply voltage gate drive (used at low load currents) and higher supply voltage gate drive (used at higher load currents).

In the analog supply regulation embodiment of the present invention, for detecting load current to modulate the gate drive supply, a current comparator having a first reference input and second input can be connected to receive current feedback based on the load current. A connector couples a least one power supply to the first or second driver though a switch or a second regulator. The output of the comparator is connected to and controls the switch or regulator, wherein a signal from the comparator switches a voltage level of the power supply between at least two different levels based on the level of the load current. The invention thus provides a higher gate driver voltage supply at higher load currents, and lower gate driver voltage supply at lower load currents. The result of using the invention is the power efficiency curve shown as a solid line in FIG. 4, where the efficiency transitions between the low gate driver voltage supply drive curve for low load current and the high gate driver voltage supply curve for high load current curves shown in FIG. 3.

Figure 5:
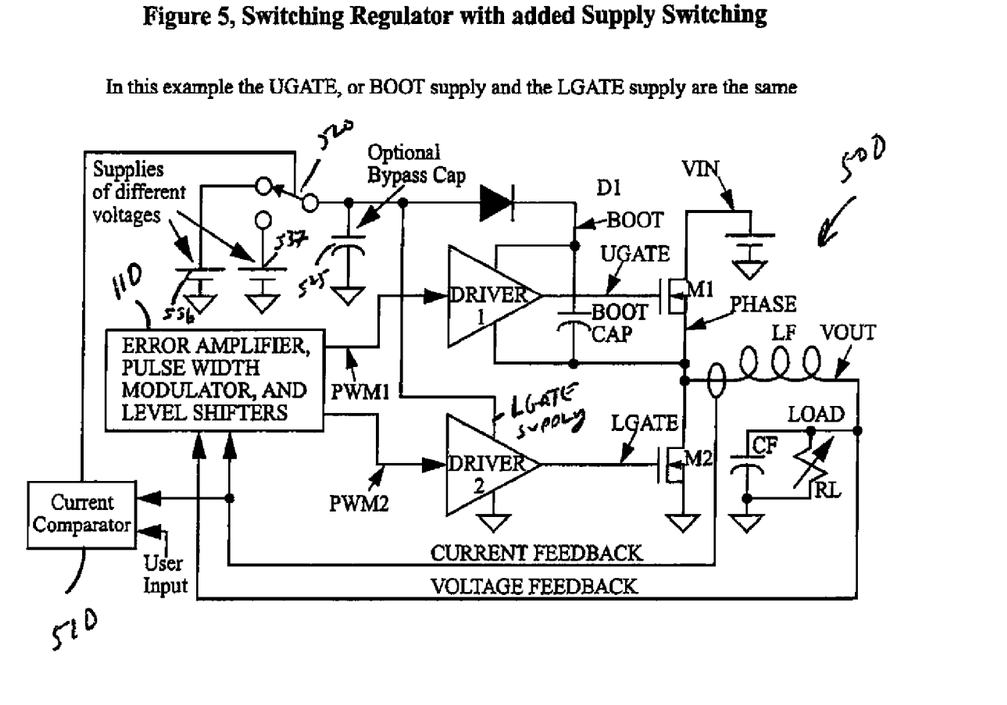
FIG. 5 shows the schematic of a closed loop pulse width modulated DC-DC regulator with added gate supply voltage switching according to an embodiment of the invention with emphasis on the output portion of the regulator.

FIG. 5 shows the schematic of an exemplary closed loop pulse width modulated DC-DC regulator 500 with added analog gate driver voltage supply switching according to an embodiment of the invention with emphasis on the output portion of the regulator which illustrates the switched supply approach. Control section 110, not being part of the present invention, is shown in added detail below regulator 500 in FIG. 5. Compared to regulator 100 shown in FIG. 1, regulator 500 has an added current comparator 510 that compares the inductor current (being essentially on average equal to the load current) to some current level, such as a user inputted current level. The comparator 510 controls a switch 520 which selects between one of two different voltage supplies, 536 and 537, to send to the Drivers 1 and 2 which provide gate drive for M1 (UGATE) and M2 (LGATE), respectively.

Although two drivers, Driver 1 and Driver 2, are shown in FIG. 5, there can be arrangements other than exactly two drivers. For example, for multi-phase systems according to the invention there would be generally be more than 2 drivers, such as repeated (parallel) pairs of upper and lower drivers (not shown). There are also systems according to the invention where there is only an upper driver, such as where lower driver (Driver 2) and FET (M2) are replaced by a passive diode (not shown).

Although M1 and M2 are described herein as being n-channel DMOS transistors, M1 and M2 can be conventional single diffused transistors, or can be p-channel transistors. P-channel transistors would require a different driver connection than that shown in FIG. 5.

It is generally desirable to bypass the drive supplies 536 and 537 with a capacitor, such as bypass capacitor 525, so that pulsed loads that are typical of driving the DMOS gates of M1 and M2 do not cause a significant voltage drop across the switch 520 which selects between the respective supplies 536 and 537. Bypass capacitor 525 can be internal or external to the chip. In the case of external placement, this might result in an additional pin on the IC to accommodate the addition of an external bypass capacitor.

An extra supply is not generally required to support supply switching regulators according to the invention. In an IC, there might be two supplies providing different voltage levels already available on chip, such as a relatively high voltage supply used for $V_{IN}$ (for the output stage) and a lower voltage supply used to power the small signal circuitry. In this case, these two (2) existing supply inputs could be used as power supplies for supplies 536 and 537, respectively.

The BOOT and/or LGATE voltage supplies could be switched between two or more specific supply voltages based on one or more specific load current levels. Some hysteresis might be desirable, so that load currents near the switching point(s) do not create switching back and forth between the respective drive supplies. In one embodiment, hysterisis can be implemented by a pair of comparators 510 and switches 520, with a first comparator, an inverter, and a first switch associated with one power supply 536, and a second comparator and a second switch associated with the other power supply 537. In this arrangement, one load current level is used as a first reference input to the first comparator coupled an inverter which is coupled to the first switch to switch to the lower supply voltage level when the load current is less than the first reference level. A higher load current level is used as a reference level to the second comparator coupled to the second switch to switch to the higher supply voltage level when the load current exceeds the second reference level.

When switching from the higher voltage supply to the lower voltage supply it might be desirable to first allow the bypass capacitor 525 to discharge until its voltage is close to the voltage of the lower supply. This discharge would be a natural result of the average supply current being drawn by the drivers. Only when the capacitor voltage gets close to the lower voltage supply would the switch 520 to that supply be turned on. This avoids "dumping" the energy in the capacitor when turning on switch 520, causing wasted power dissipation.

Although the load current levels at which the gate drive supplies are switched is shown as being user adjustable in FIG. 5 based on user input of a reference current level to comparator 510, the load current levels can instead be set on the chip. For example, one or more reference inputs to the IC could be provided for the IC to compare the sensed load current against. For instance, due lack of available pins, the supply switching points may be made to be fixed ratios of some other settable current, such as the over current trip current which is generally always already available. For example, if the over current trip point is user settable, the supply switching point could be made a fixed percentage of that, such as, for example, 10, 20 or 30% of the over current trip point.

Figure 6:
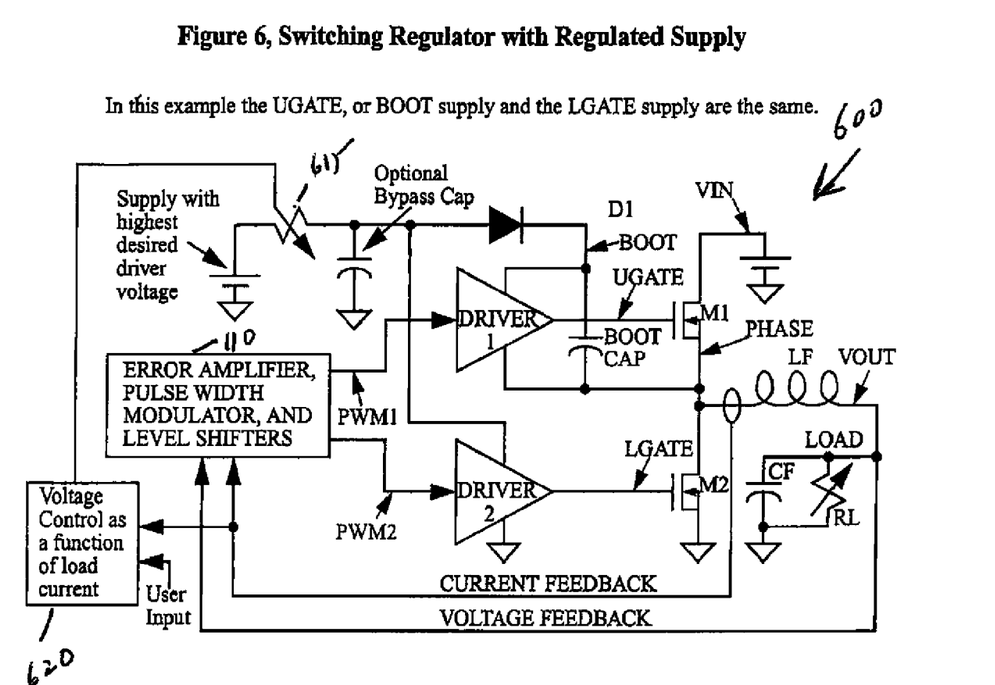
FIG. 6 shows the schematic of a closed loop pulse width modulated DC-DC regulator with added gate voltage supply switching implemented with a regulated supply according to an alternate embodiment of the invention.

FIG. 6 shows the schematic of a closed loop pulse width modulated DC-DC regulator 600 having added gate driver voltage supply switching implemented with a regulated supply according to an alternate embodiment of the invention. Instead of switching the gate driver voltage supply between two or more fixed supplies using a comparator signal, a single voltage supply together with a voltage regulator 615 and a voltage controller 620 can be used. The single fixed supply provides a level at least as high as the desired highest driver supply voltage, and the regulator 615 controlled by voltage controller 620 drops the regulated supply voltage as a function of load current. For instance, the user might provide two or more current reference input levels corresponding with two or more voltage levels. The voltage regulator 620 would transition between the lower voltage when the load is at the lower reference current to the upper voltage when the load is at the upper current reference.

Regarding regulator 600, there is generally some power loss to be expected if regulator 600 used a linear regulator to reduce the driver supply voltage. However, since switching power losses are related to the square of the driver supply voltage, a net overall benefit in power efficiency results using regulator 600.

More generally, gate driver voltage supply switching could be applied to only the LGATE supply or only the BOOT supply, with the other supply being unswitched. Alternately, two different relationships could be used, such as one that relates the BOOT supply voltage to one load current level and one that relates the LGATE supply voltage to another load current, such as the hysterisis arrangement described above.

Figure 7:
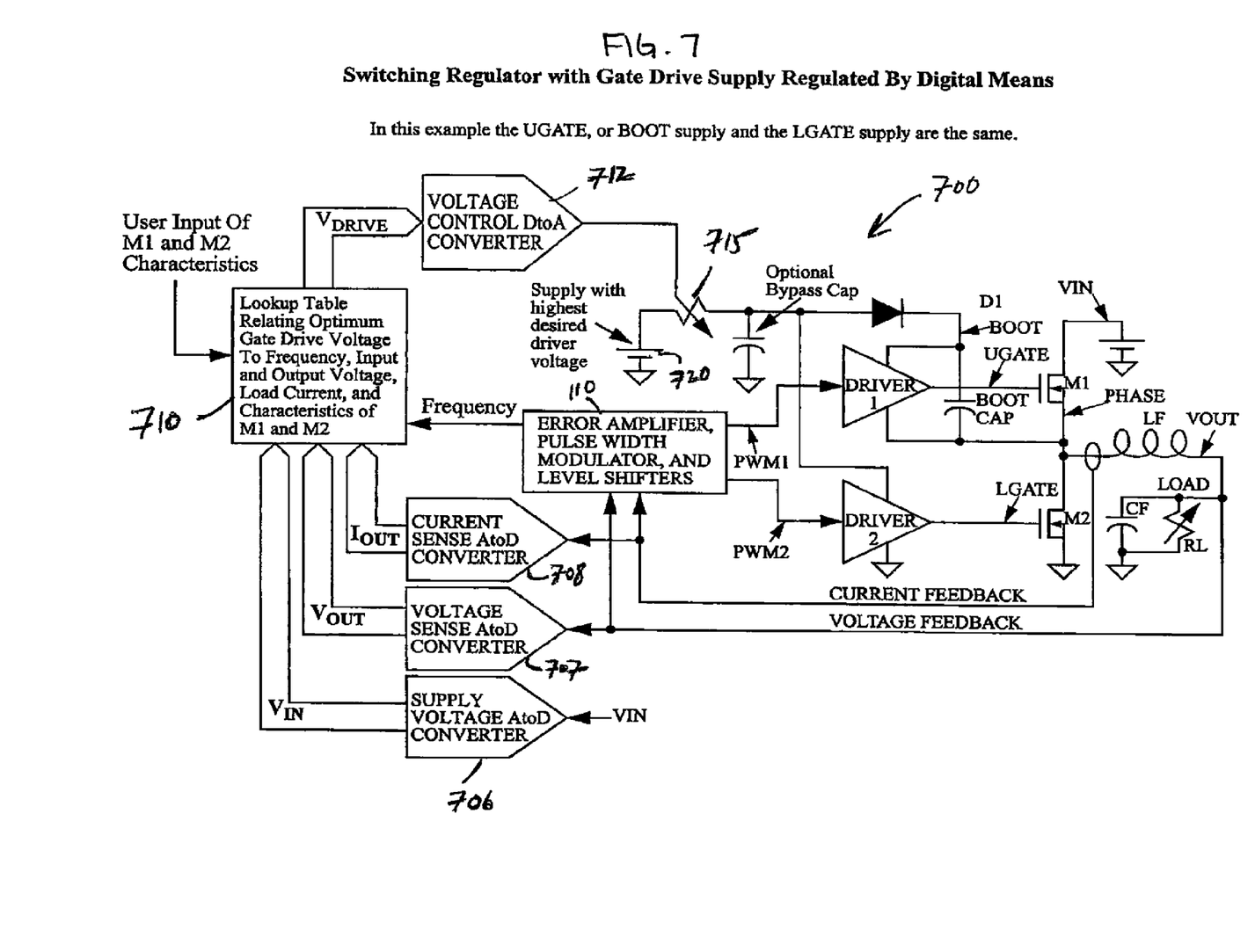
FIG. 7 shows the schematic of an exemplary closed loop pulse width modulated DC-DC regulator which utilizes digital circuitry for implementing gate drive supply voltage switching.

Regarding the digital supply regulation embodiment of the present invention, FIG. 7 shows the schematic of an exemplary closed loop pulse width modulated DC-DC regulator with added digital gate driver voltage supply switching 700, according to an embodiment of the invention. As before, the schematic provided emphasizes the output portion of the regulator.

Regulator 700 provides factors that significantly affect power efficiency, digitizes analog output measures, and feeds the efficiency affecting measures to a digital block, comprising an circuit implementing an algorithm or look up table 710 (referred to hereafter as look up table 710). The digital implementing components can all be formed on the same chip as the conventional regulator components. The analog measures shown in FIG. 7 include load current ($I_{OUT}$) and output voltage ($V_{OUT}$) which are coupled to A/D converters 708 and 707, respectively. The $V_{IN}$ supply level is also shown digitized by A/D 706. The digital outputs of A/Ds 706-708 as well as frequency information from control section 110 are provided to look up table 710, which also stores relationships and characteristics that affect regulator power efficiency. The relationships and characteristics can include characteristics of output devices M1 and M2, such as both gate charge and RDSon verses gate drive voltage level. In one embodiment, these characteristics of M1 and M2 can be entered into look up table 710 externally by user input.

The resulting digital output shown as $V_{DRIVE}$ from look up table 710 is converted back to an analog signal using D/A converter 712, which is used to modulate the gate drive voltage supply level using supply 720. Supply 720 provides the highest desired driver voltage coupled to voltage regulator 715. The output provided by regulator 715 is the optimum gate driver voltage which is utilized as the BOOT and LGATE supply to Drivers 1 and 2, which provide gate drive for M1 (UGATE) and M2 (LGATE), respectively.

Although the UGATE/BOOT and LGATE voltage supply are the same in regulator 700 shown in FIG. 7, separate supplies can also be used, such as using separate regulators or a switch-based arrangement analogous to regulator 500 shown in FIG. 5. Hysterisis as described above can also be implemented for regulator 700.

The invention can be used to provide improved power efficiency for switching regulator circuits including DC-DC converters, motor controller circuits, and the like, particularly those that handle a wide range of load currents. The invention may be used in conjunction with other efficiency improvement structures ands related methods.

It is to be understood that while the invention has been described in conjunction with the preferred specific embodiments thereof, that the foregoing description as well as the examples which follow are intended to illustrate and not limit the scope of the invention. Other aspects, advantages and modifications within the scope of the invention will be apparent to those skilled in the art to which the invention pertains.

I claim:

1. A load compensated voltage regulator, comprising:
a chip including a control section comprising an error amplifier, a pulse width modulator (PWM), an input of said PWM hooked to an output of said error amplifier, said PWM outputting at least one driver control signal, at least one driver having an input coupled to receive said driver control signal, and an output stage comprising at least one output transistor having an input coupled to an output of said driver, said output transistor driving an inductor in series with a grounded capacitor, wherein an output of said regulator ($V_{OUT}$) is at a node between said inductor and said capacitor, said $V_{OUT}$ generating a load current across a load when connected across said capacitor;

a feedback connector for feeding back a feedback signal representative of said load current to circuitry for outputting a gate driver voltage supply control signal based on at least one reference level and said feedback signal, and a connector coupling at least one power supply to said driver through a switch or a second regulator, said gate driver voltage supply control signal being coupled to said switch or regulator, wherein said gate driver voltage supply control signal modulates a voltage level of said power supply between at least two different voltage levels based on said load current.

2. The voltage regulator of claim 1, wherein said feedback signal comprises a current feedback signal and said reference level comprises a current reference level.

3. The voltage regulator of claim 1, wherein said PWM outputs at least a first and a second driver control signal and said at least one driver comprises a first and second driver for receiving said first and second driver control signals, said first and second drivers driving gates of first and second output transistors, respectively.

4. The voltage regulator of claim 1, wherein said circuitry for outputting a gate driver voltage supply control signal comprises at least one comparator.

5. The voltage regulator of claim 4, wherein an output of said comparator is coupled to said switch.

6. The voltage regulator of claim 4, wherein said comparator comprises a first and a second comparator, and said switch comprises a first and second switch, wherein said first comparator and said first switch are associated with a first lower voltage power supply and a second comparator and said second switch are associated with a second higher voltage power supply, wherein said at least one reference level comprises a first and a second reference level, wherein said first reference level is input to said first comparator to switch to said first lower supply voltage level when said load current is less than said first reference level and a higher load current level is used as a second reference level to the second comparator to switch to said second higher supply voltage level when said load current exceeds said second reference level.

7. The voltage regulator of claim 1, wherein said reference level is set on said chip.

8. The voltage regulator of claim 7, wherein said reference level comprises a current reference level, said current reference level being a fixed ratio of a settable current available on said chip.

9. The voltage regulator of claim 8, wherein said settable current comprises an over current trip current.

10. The voltage regulator of claim 1, wherein said circuitry for outputting a gate driver voltage supply control signal comprises at least one A/D converter for receiving said feedback signal representative of said load current, a digital output of said A/D is coupled to a circuit implementing an algorithm or look up table, said look up table storing at least one of gate charge and RDSon verses a gate drive voltage supply level for said output transistor, said look up table providing a digital gate driver voltage supply signal, wherein said digital gate driver voltage supply control is coupled to D/A converter, and an output of said D/A providing said gate driver voltage supply control signal.

11. The voltage regulator of claim 10, wherein said gate driver voltage supply control signal is coupled to said second regulator.

12. The voltage regulator of claim 10, wherein said at least one A/D converter comprises at least a first and a second A/D converter, wherein said second A/D receives a signal representative of said $V_{OUT}$.

13. The voltage regulator of claim 10, wherein said control section is coupled to said circuit implementing an algorithm or look up table, said control section providing frequency information to said circuit implementing an algorithm or look up table.

14. A method of load compensating a voltage regulator, comprising the steps of:

providing a voltage regulator comprising a chip including a control section comprising an error amplifier, a pulse width modulator (PWM), an input of said PWM hooked to an output of said error amplifier, said PWM outputting at least one driver control signal, at least one driver having an input coupled to receive said driver control signal, and an output stage comprising at least one output transistor having an input coupled to an output of said driver, said output transistor driving an inductor in series with a grounded capacitor, wherein an output of said regulator ($V_{OUT}$) is at a node between said inductor and said capacitor, said $V_{OUT}$ generating a load current across a load when connected across said capacitor;

detecting said load current; and using said load current to modulate a supply voltage supplied to said gate driver, wherein a higher gate drive supply voltage is used at higher load currents and lower gate drive supply voltage is used at lower load currents.

15. The method of claim 14, wherein said voltage supply supplied to said gate driver is provided by switching between two fixed power supplies.

16. The method of claim 14, further comprising the steps of:

digitizing a signal representative of said load current to provide a digital load current signal, and determining said supply voltage supplied to said gate driver based on said digital load current and at least one parameter selected from the group consisting of operating frequency of said regulator, input voltage supplied to an output device of said regulator, output voltage of said regulator, gate charge for said output device, and RDSon verses said supply voltage supplied to said gate driver for said output device.

17. The method of claim 14, wherein said voltage regulator includes a first and second driver for receiving first and second gate driver voltage supply control signals, said first and second drivers driving gates of first and second output transistors, further comprising the step of:

determining a supply voltage for said first driver based on a first reference level and a supply voltage for said second driver based on a second reference value, said first and second reference levels corresponding to different load current levels.

* * * * *